United States Patent [19]
Wiscombe

[11] Patent Number: 5,592,394
[45] Date of Patent: Jan. 7, 1997

US005592394A

[54] FET CURRENT SENSOR FOR ACTIVE BALANCING OR REGULATING CIRCUITS

[75] Inventor: Nathan Wiscombe, Cedar Park, Tex.

[73] Assignee: Dell U.S.A., L.P., Austin, Tex.

[21] Appl. No.: 522,038

[22] Filed: Aug. 31, 1995

Related U.S. Application Data

[63] Continuation-in-part of Ser. No. 381,044, Jan. 31, 1995.

[51] Int. Cl.⁶ ............................................. H02J 1/00
[52] U.S. Cl. ........................ 364/492; 364/482; 364/483; 307/31; 307/32
[58] Field of Search ....................... 364/492, 483, 364/482; 363/21, 89, 71–72; 323/285; 307/64–66, 43–44, 85–87, 80, 82, 31–32, 71–72

[56] References Cited

U.S. PATENT DOCUMENTS

| | | | |
|---|---|---|---|
| 4,194,147 | 3/1980 | Payne et al. | 323/17 |
| 4,618,779 | 10/1986 | Wiscombe | 307/60 |
| 4,635,178 | 1/1987 | Greenhalgh | 363/65 |
| 4,698,517 | 10/1987 | Tohya et al. | 307/43 |
| 4,698,738 | 10/1987 | Miller et al. | 363/65 |
| 4,707,620 | 11/1987 | Sullivan et al. | 307/270 |
| 4,729,086 | 3/1988 | Lethellier | 363/65 |
| 4,879,624 | 11/1989 | Jones et al. | 361/65 |
| 4,893,228 | 1/1990 | Orrick et al. | 363/89 |
| 5,075,569 | 12/1991 | Branson | 307/270 |
| 5,157,269 | 10/1992 | Jordan et al. | 307/59 |

Primary Examiner—Emanuel T. Voeltz
Assistant Examiner—Hien Vo
Attorney, Agent, or Firm—Haynes and Boone, L.L.P.

[57] ABSTRACT

A method and apparatus for balancing shared power supplies or regulating a power supply device includes disposing a transistor (310) in series with a power supply current that is supplied to a load resistor (316) The gate of the transistor (310) is controlled by a control circuit (320) to set the gate-to-source voltage thereon to define a desired current therethrough. The voltage across the transistor (310) is measured with a voltage detector (322) and then a current conversion device (324) is operable to use a look up table to determine from the gate voltage on the transistor (310) what the impedance across the drain-to-source is and then calculate the current. This current is then utilized by the control circuit (320) to control the current through transistor 310. This therefore allows transistor (310) to both provide the control operation and provide the sensing operation, thus eliminating the requirement for a separate sense resistor.

11 Claims, 5 Drawing Sheets

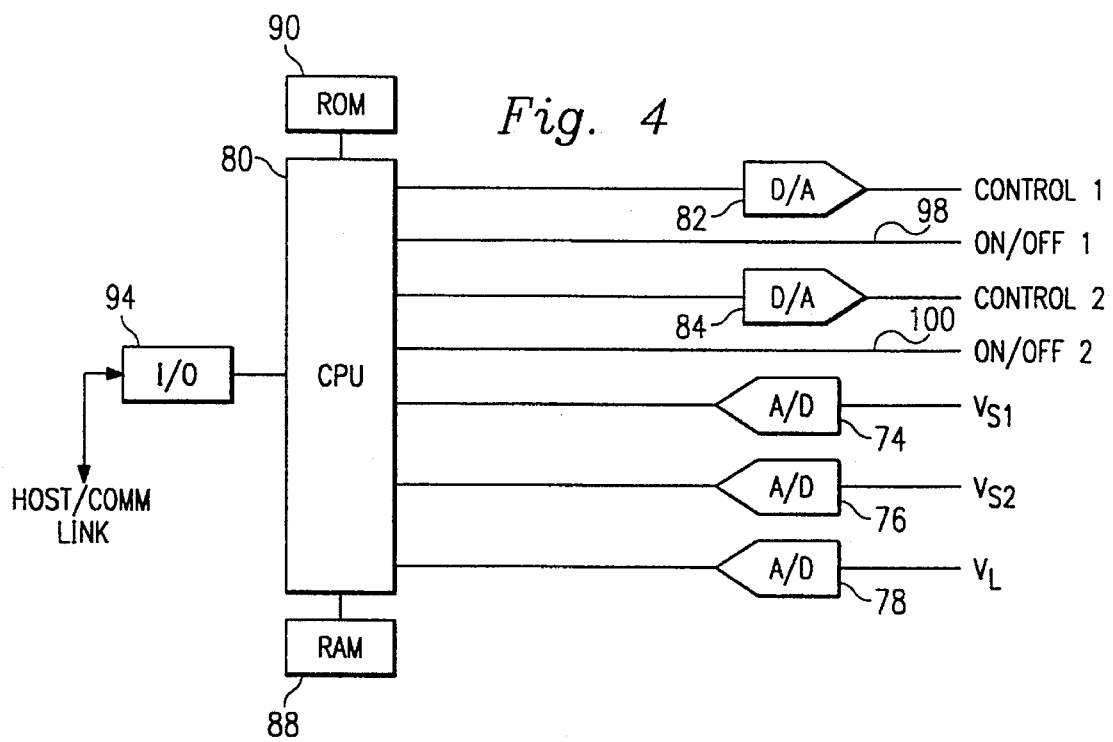
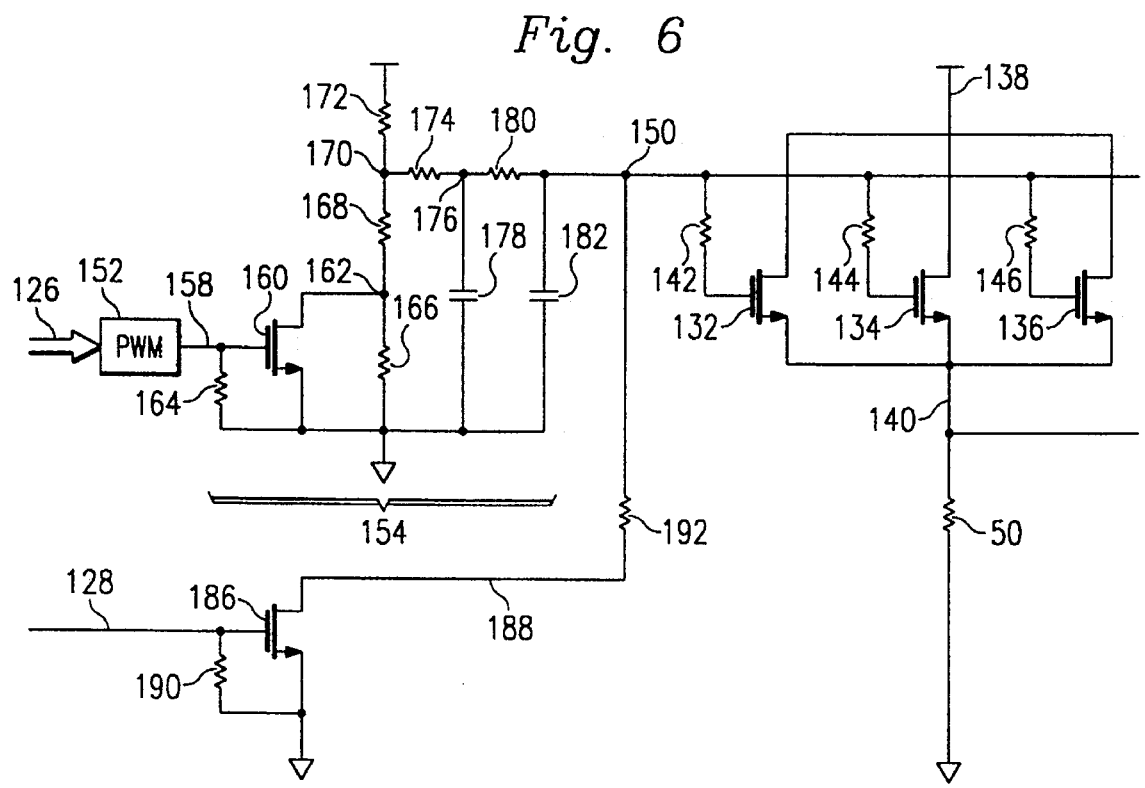

FET CURRENT SENSOR FOR ACTIVE BALANCING OR REGULATING CIRCUITS

CROSS REFERENCE TO RELATED APPLICATIONS

This application is a Continuation-in-Part application of U.S. patent application Ser. No. 08/381,044, filed Jan. 31, 1995, and entitled "Active Output Impedance Control for Current Sharing of Paralleled Power Supplies."

TECHNICAL FIELD OF THE INVENTION

The present invention pertains in general to power supplies, and more particularly, to a technique for sensing current through a series regulating balancing element by sensing the voltage thereacross.

BACKGROUND OF THE INVENTION

To reduce the cost per watt of power supplies in high power systems, and provide highly reliable, redundant power systems, the industry has been attempting to parallel low cost supplies. Although a "ground-up" design may make it more feasible to develop a totally integrated power system, this is typically the most expensive approach. This is due to the fact that such a power supply will have only limited use. By comparison, lower wattage PC power supplies are made in large quantities, and therefore, the dollars/watt for these power supplies is typically the lowest. In order to reduce cost, the industry has been trying to parallel these low cost power supplies. However, this tends to be difficult in that any modification of the power supplies to provide internal control thereto defeats the cost advantages provided by the power supply itself, and without some type of control, the performance of the combined power supply is less than satisfactory.

One technique that the industry has attempted to utilize is a master/slave combination. This defines one of the power supplies as the master with the remaining power supplies designated as slaves. This provides some redundancies but, if the master fails, the whole system will go down. Another technique is to utilize fixed resistors to balance the loading between paralleled supplies. This has a drawback of poor regulation when one supply fails, as the fixed resistor associated with the failed supply remains in the system, resulting in more current through this resistor, wherein the voltage "droop" could become excessive. This can present a problem in modem day computers in that the central processing chips will not tolerate much voltage droop. This would therefore require additional parallel resistors to be added to reduce this voltage droop, which is difficult to accomplish.

Another technique for paralleling power supplies is to provide a feedback loop that is common to the power supplies However, this method requires customizing the supply and, therefore, raising costs. Of course, there are some supplies that allow for direct parallel operation. These are referred to as "voltage droop" power supplies whereto the output voltage is designed to droop depending upon the output current. However, this type of parallel configuration has problems with tight regulation requirements. Another system, an active voltage sense control system, provides an external paralleling board for sensing the current from each supply and subsequent control of the output by feeding back an external signal on its external sense line. These systems have some disadvantages in that they require remote sensing to be on the supply, thus increasing cost. Further, the control board now constitutes an additional reliability consideration.

Another technique, a passive voltage sense control system, is similar to the active voltage sense control, but it utilizes fixed passive elements in series with the voltage sense lines to force current sharing. This system does not have as tight a regulation as the active voltage sense control method, but it does have some destructive failure sense modes.

An additional cost factor for a power supply is the series sense element, typically a sense resistor, that is required to determine the current through the power supply. Use of such a resistor, in addition to increasing the parts count, also results in the need for higher voltages and unwanted power losses.

SUMMARY OF THE INVENTION

The present invention disclosed and claimed herein comprises an apparatus for regulating the flow of current in a power supply device. The apparatus includes an active impedance device that is disposed in the current path of the power supply device. The impedance of the active impedance device is controlled by a received control signal. The active impedance device has a known impedance relationship to the voltage level of the control signal. The voltage across the active impedance device is first detected and then the current therethrough determined by a current processor. The current processor is operable determine the impedance value of the active impedance device associated with the voltage level of the control signal. This is utilized in conjunction with the determined voltage across the active impedance device to calculate the current through the active impedance device. A control system then controls the power supply device utilizing the determined current to generate the control signal.

In another aspect of the present invention, the current processor is comprised of a look up table and a processor. The look table is operable to store the known relationship between the impedance of the active impedance device and the voltage level of the control signal. The processor is operable to retrieve the impedance value associated with the voltage level of the control signal and then calculate the current through use of the retrieved impedance value and the detected voltage level across the active impedance device.

In a yet further aspect of the present invention, the processor is part of the control system and is operable to utilize the stored known relationship to calculate a new value for the control signal in order to perform a regulation operation in accordance with a predetermined power supply operating scheme.

BRIEF DESCRIPTION OF THE DRAWINGS

For a more complete understanding of the present invention and the advantages thereof, reference is now made to the following description taken in conjunction with the accompanying Drawings in which:

FIG. 4 illustrates the central processing unit and the interface thereto;

FIG. 6 illustrates a detail of a single active impedance control element;

DETAILED DESCRIPTION OF THE INVENTION

Figure 1:
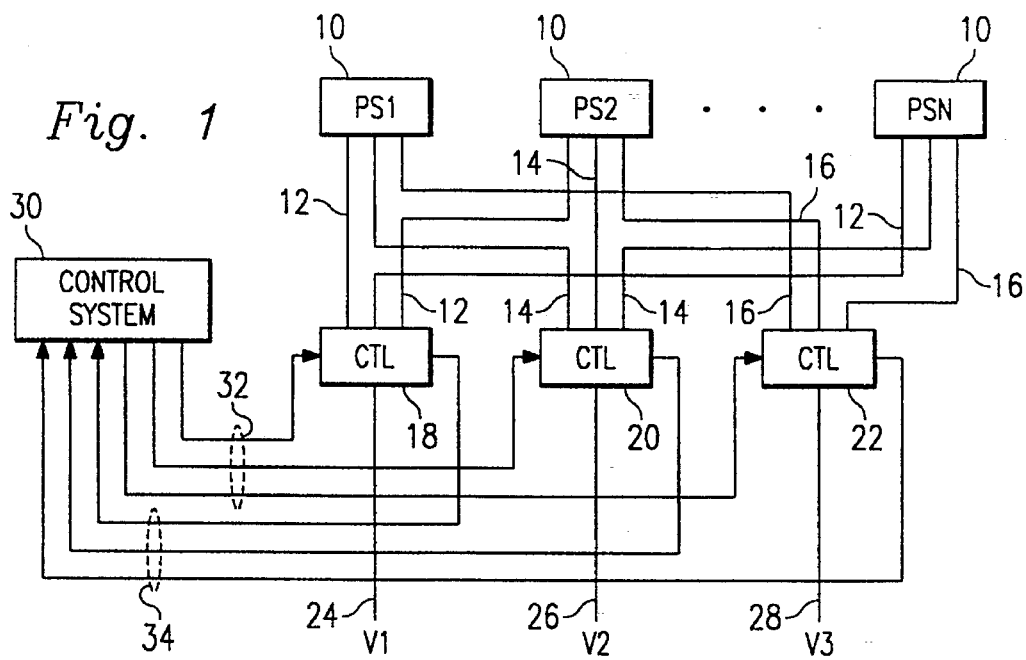
FIG. 1 illustrates an overall block diagram of a paralleled power supply system.

Referring now to FIG. 1, there is illustrated a block diagram of a paralleled power supply system. In this system, there are provided multiple power supplies 10, labeled PS1, PS2, ... PSN. Each of the power supplies 10 has associated therewith three separate output lines 12, 14 and 16, each associated with a different voltage. Each of the power supply output lines 12–16 for each of the power supplies 10 is input to a separate active impedance control block 18, 20 and 22, respectively, each of the active impedance control blocks 18–22 associated with one of the power supply outputs 12–16. The control block 18 is associated with the power supply outputs 12, the control block 20 is associated with the power supply outputs 14 and the control block 22 is associated with the power supply outputs 16. Control block 18 thereafter outputs a voltage V1 on a line 24, control block 20 outputs a voltage V2 on a line 26 and control block 22 outputs a voltage V3 on a line 28.

The control blocks 18–22 each have a control input and a sense output for each output line of each power supply 10. A control system 30 is operable to provide control outputs on lines 32, one for each input 12–16 to each of the control blocks 18–22. Sense lines from each of the control blocks 18–22 are provided on lines 34 for each output of each supply 10 and one for each control block output 24–28 to the control system 30. The control system 30 is operable to control each of the control blocks 18 to provide a balanced current sharing of the power supplies 10 for the associated ones of the lines 12–16.

Figure 2:
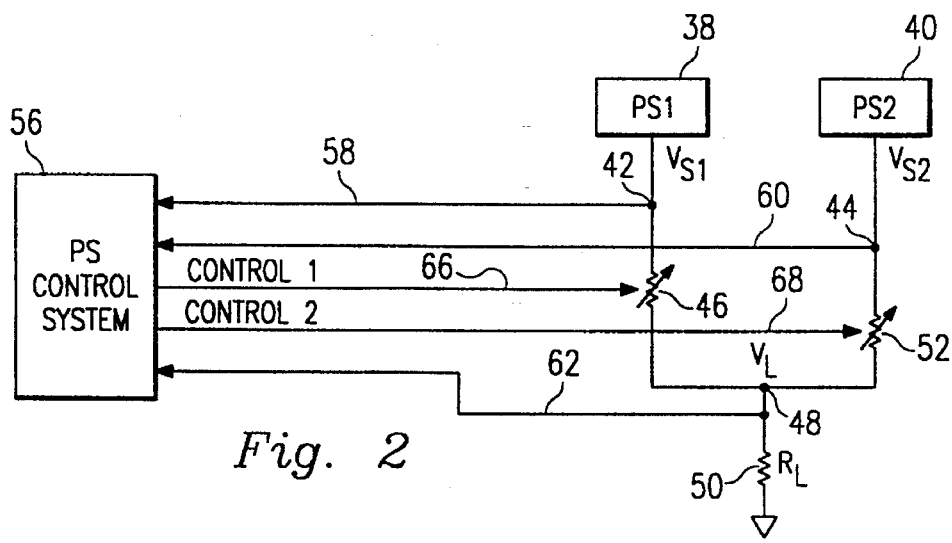
FIG. 2 illustrates a more detailed block diagram of the current sharing technique of the present invention.

Referring now to FIG. 2, there is illustrated a more detailed block diagram of the impedance control for a single voltage output from two supplies 38 and 40, the power supply 38 supplying a voltage $V_{S1}$ on a node 42 and power supply 40 supplying a voltage $V_{S2}$ on a node 44. Node 42 is connected to one side of an active impedance device 46, the other side thereof connected to an output node 48, output node 48 connected to one side of a load resistor 50. Similarly, node 44 for the $V_{S2}$ voltage is connected to one side of an active impedance device 52, the other side thereof connected to the output node 48. The output node 48 is labeled with a voltage $V_L$.

A power supply control system 56, similar to the control system 30, is operable to receive voltage $V_{S1}$ on a line 58 from the node 42 and to receive the voltage $V_{S2}$ on a line 60 connected to the node 44. A sense line 62 is connected between a control system 56 and the node 48 to provide information about the voltage $V_L$. As such, the voltage across each of the active impedance devices 46 and 52 can be determined. Thereafter, a control signal CONTROL1 and a control signal CONTROL2 can be output by the control system 56 to the respective active impedance devices 46 and 52 on lines 66 and 68, respectively.

In operation, the control system 56 is operable to sense the voltage across the active impedance devices 46 and 52 to thereby determine the current therethrough. The impedance values of each of the active impedance devices 46 and 52 can then be adjusted to ensure that the current is equally shared between the two power supplies 38 and 40. It is important to note that this is done external of the power supplies 38 and 40, such that "off-the-shell" power supplies can be utilized. Additionally, as will be described in more detail hereinbelow, the impedance devices can be placed into a high impedance or "off" condition in the event that there is a power supply failure, this then isolating the failed one of the power supplies from the system.

Figure 3:
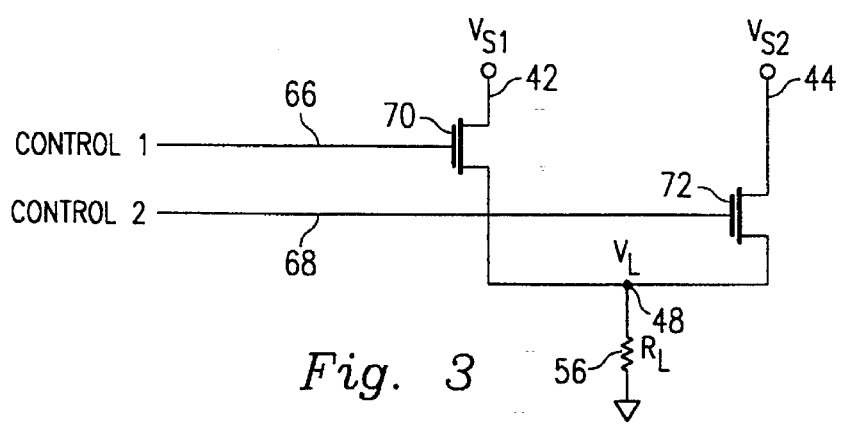
FIG. 3 illustrates the use of field effect transistors as the active control elements.

Referring now to FIG. 3, there is illustrated a detail of the active impedance devices 46 and 52, utilizing field effect transistors. A field effect transistor 70 is utilized to realize the active impedance device 46, with the source/drain path thereof disposed between nodes 42 and 48 and the gate thereof connected to the line 66 to receive the CONTROL1 signal. Similarly, a field effect transistor 72 is utilized to realize the function of the active impedance device 52, with the source/drain path thereof connected between the node 44 and the node 48 and the gate thereof connected to the control line 68 labeled CONTROL2. Each of the transistors 70 and 72 is a low $R_{DS\_ON}$ device which is manufactured by Siliconix under the part number SUP60N06-08. This device is a device that has a relatively linear region of operation with an impedance variability that can be controlled between 10 mW to 20 mW in that linear region of operation. The gate voltage for this transistor varies from approximately 3.5 volts to 7 volts to achieve this range of impedance variability. Typically, this is done in discrete steps. Additionally, as will also be described hereinbelow, the transistors 70 and 72 are oriented such that the intrinsic diode therein is connected with the anode thereof connected to the respective one of the nodes 42 or 44 and the cathode thereof connected to the node 48, thus reverse biasing this diode if the transistor is ever rendered non-conductive and the power supply voltage falls below the load voltage. It should be readily appreciated that the transistors 70, 72 may be paralleled with other similar transistors to control currents greater than may be handled by a single transistor. For PC applications, 10 amps per transistor is typical.

Referring now to FIG. 4, there is illustrated a diagrammatic view of the control portion of the control system 56. Each of the sense voltages $V_{S1}$, $V_{S2}$ and $V_L$ are input to the analog input of an analog to digital converter through a plurality of analog multiplexors 74, 76 and 78. These are typically realized with analog multiplexors of the type MC14051B/MC14052B manufactured by Motorola. The output of the analog multiplexors 74–78 are input to a CPU 80 (the CPU containing the A/D converters). The CPU 80 is of the type MC68HC11 G5 manufactured by Motorola. Additionally, the control signals are generated by the CPU 80 and are in a digital format. The digital values are input to the digital input of respective digital/analog (D/A) converters 82 and 84 to output the respective control signals CONTROL1 and CONTROL2. The CPU 80 has associated therewith memory in the form of Random Access Memory 88 and non-volatile or Read Only memory 90. The CPU 80 is operable to interface with either a host system or a communication link through an input/output (I/O) interface 94. Note: the MC68HC11G5 contains the ROM 90, the RAM 88, the A/D converters, and some of the PWM outputs that drive the D/A converters. It should be readily appreciated, however, that alternative arrangements of CPU, A/D converters and PWM's may be used without departing from the scope of the present invention. In addition, it should be appreciated that although the preferred embodiment being discussed provides a digital method of control, alternative analog control circuits may be used without departing from the spirit of the present invention.

In operation, the CPU 80 is operable to receive the digital values of the two sense voltages $V_{S1}$ and $V_{S2}$ and the value of the load voltage $V_L$. From this, the CPU 80 can determine the drain-to-source voltage ($V_{DS}$) of each of the transistors 70 and 72. From this voltage, a current can be determined if the active impedance of the transistor is known. In order to do this, a predetermined relationship between the current, the $V_{DS}$ of the transistor and the gate voltage of the transistor is defined. This predetermined relationship is as follows:

$$I = \frac{V_{PS} - V_L}{3e^{-(\frac{V_G - V_{PS}}{0.8})} + 0.027}$$

where:

$V_{PS}$ equals Power Supply Voltage;

$V_G$ equals the Gate Voltage with respect to ground;

Note: $V_G - V_{PS} = V_{GS}$; and 0.0027 equals a factor that can vary depending upon the characteristics of the transistors Note: the equation provided above is typical for an active impedance device 70, 72 which is comprised of three devices in parallel. It should be understood that alternative equations may be developed if more than 3 devices are desired to be used. Once the current through the transistors is known, the CPU then generates changes to the gate voltage to alter the active impedance to vary the currents to achieve a substantially balanced current. This is achieved in a number of ways. In one method, the resistance is increased for the highest current supply and decreased for the lowest current supply. In another method, the active impedances are adjusted such that the best approximation toward the mid range of the impedances of the transistors 70 and 72 to achieve optimum operation without operating any of the active impedances at their extremes. Another more common method saturates the FET's on the supply with the lowest output voltage, then adjusts the control FET's on the remaining supply's outputs which are paralleled with it. This will achieve the lowest voltage drop between the supplies and the load.

Although the CPU 80 is utilized to calculate this equation, it should be understood that a combinatorial logic device such as a gate array could be utilized to realize the calculation. Further, an analog solution could be utilized. Additionally, a lookup table could be generated for all values and stored in the RAM 88 with the CPU 80 merely obtaining the appropriate values from the lookup table for all possible combinations of the sense voltages $V_{S1}$ and $V_{S2}$ and the load voltage $V_L$. Thereafter, predetermined control voltages could be generated and output. In addition, for each power supply (PS1, PS2, . . . , PSN), there is generated an on/off signal on respective lines 98 and 100. These allow the CPU 80 to detect a failure of the power supply in the form of the voltage $V_{S1}$ or $V_{S2}$ falling below $V_L$, this indicating a fault in the power supply, and then turning off the associated transistors. Additionally, if the voltage goes too high, this can be determined through the current determination process and the associated transistor mined off.

Figure 5:
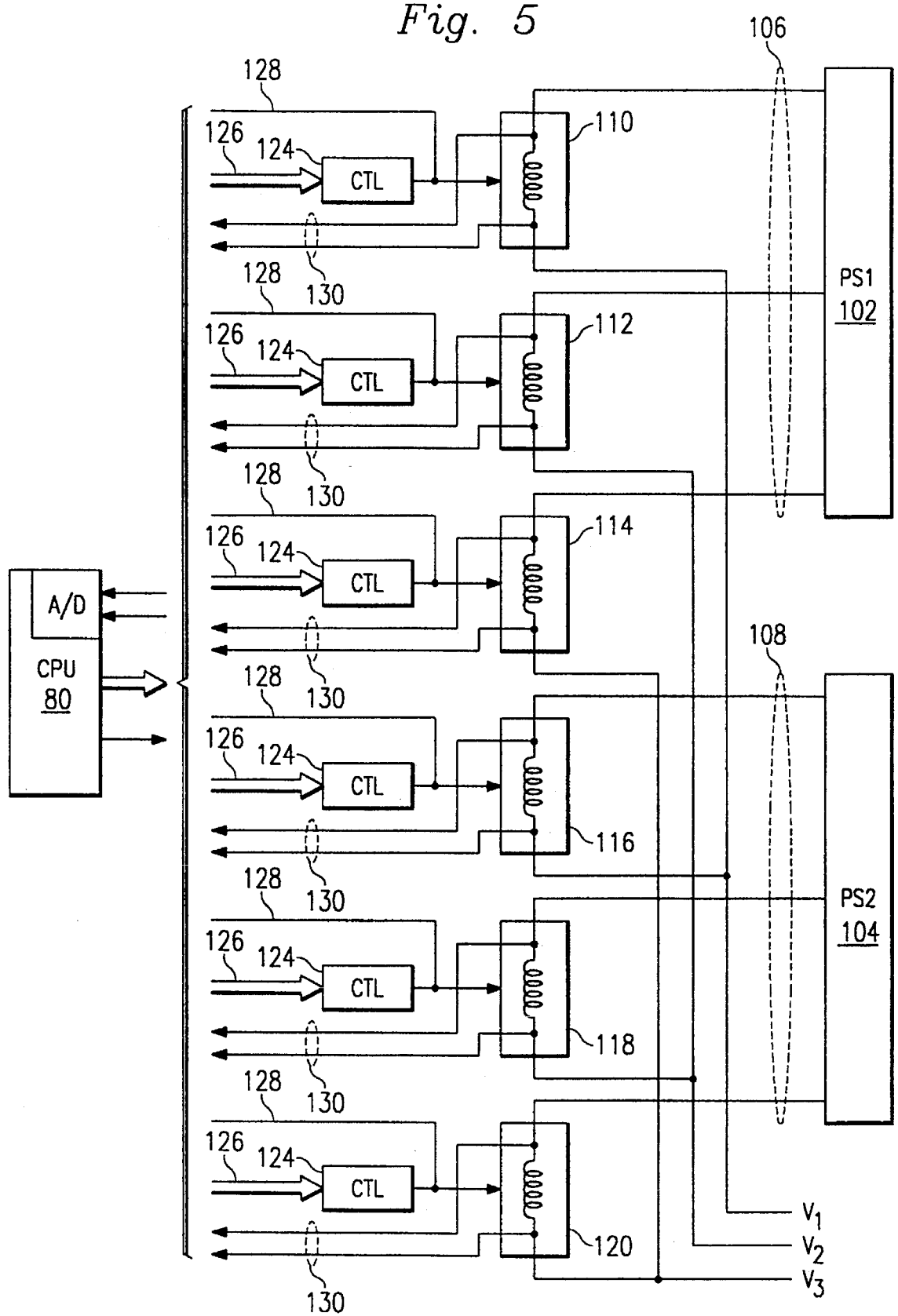
FIG. 5 illustrates a block diagram of a multiple power supply system with multiple power supply lines associated with each of the power supplies.

Referring now to FIG. 5, there is illustrated an overall block diagram of one configuration for realizing control of two power supplies 102 and 104, each operable to output three voltages on a set of lines 106 and a set of lines 108, respectively. Each of the lines 106 output by the supply 102 is input to a respective active impedance device 110, 112 or 114. Similarly, each of the supply output lines 108 is input to a separate active impedance device 116, 118 or 120. The output of the impedance device 110 associated with lines 106, and the output of the impedance device 116 associated with lines 108, are common voltages and are connected to voltage output line $V_1$. The active impedance device 112 associated with lines 106 and the active impedance device 118 associated with lines 108 are both associated with the same voltage level, with the outputs thereof connected to a common voltage output line $V_2$. Similarly, the remaining active impedance device 114 associated with line outputs 106 and active impedance device 120 associated with lines 108 have the outputs thereof connected to a common voltage line $V_3$, they being associated with an identical voltage level.

Each of the active impedance devices receives a control voltage from a control block 124, the output or control voltage therefrom being the analog gate voltage to the particular transistor forming the respective active impedance device. Each of the control devices 124 receives a digital input value on a digital bus 126 with an on/off signal received on a line 128. Each of the active impedance devices 110 has two sense lines 130 to sense the voltage across the associated active impedance device. The CPU 80 is operable to receive the sense lines 30 and generate the digital output control voltages for the on/off control.

Referring now to FIG. 6, there is illustrated a detail of the control blocks 124 for the associated active impedance devices 110–120. Each of the active impedance devices is configured with three parallel field effect transistors 132, 134 and 136, disposed in a parallel configuration with the source/drain paths thereof connected between a power supply node 138 and a load node 140. It should be appreciated, however, that each power supply output may utilize a different number of FET's depending on the current requirements of each voltage level. In the preferred embodiment, three FET's will provide up to 30 amps of current. The gates of each of the transistors 132–136 are connected through series resistors 142, 144 and 146, respectively, to a control voltage node 150. A D/A converter is realized with a combination of a pulse width modulation circuit 152 and a circuit 154 that is operable to convert the stream of pulses on the output of the pulse width modulator 152 into an analog control voltage on node 150. The pulse width modulator 152 is operable to receive a digital value from the bus 126 that is generated by the CPU 80, and then generate the series of pulses on an output node 158. The pulse width modulator is of the type CDP68HC68W1, manufactured by Harris Corporation. Additionally, the PWM outputs of the CPU may be used. This device is a programmable frequency duty-cycle output device that has a serial bus input. This device modulates a clock input to supply a variable frequency and duty-cycle output signal. There are internally three 8-bit registers (pulse width, frequency and control) that are accessible through the bus 126 to allow initialization of the device operation. The value in the pulse width register selects the high duration of the output period.

The output node 158 is connected to the gate of an N-channel transistor 160, the source/drain path thereof connected between a node 162 and ground. A load resistor 164 is disposed between the node 158 and ground. The node 162 is connected to one side of a resistor 166, the other side thereof connected to ground and also to one side of a resistor 168, the other side thereof connected to the node 170. Node 170 connected to one side of a resistor 172, the other side thereof connected to a power supply voltage $V_{CP}$, this being a separate voltage for powering the part. (Note: $V_{CP}$ equals the voltage from the charge pump. A charge pump is used to boost the +5 v input up to 19 v to drive the FET gates. This enables the whole paralleling board to operate from a single +5 v source, yet control voltages up to 12 v through the FET's.) Node 170 is connected to one side of a resistor 174 and the other side thereof connected to a filter node 176. Filter node 176 is connected to one plate of a capacitor 178, the other plate thereof connected to ground, this forming an RC network. The filter node 176 is connected to one side of a resistor 180, the other side connected to the node 150. Node 150 is also connected to one plate of the capacitor 182, the other plate thereof connected to ground, this forming an RC network. Therefore, resistor 174 and capacitor 178 and resistor 180 and capacitor 182 form a filter, with transistor 160 driving the node 170, the filter integrating the pulse stream for output to the node 150 to provide an analog voltage.

The on/off control line is connected to the gate of an N-channel transistor 186, the source/drain path thereof connected between a node 188 and ground. A resistor 190 is connected between node 128 and ground. A series resistor 192 is connected between node 188 and node 150. The transistor 186 therefore allows node 150 to be pulled low to turn off transistors 132–136.

An additional feature provided by the circuit shown in FIG. 6 is that it has a built in fail safe mechanism. For example, should the CPU 80, or the PWM circuits fail to operate, the transistors 160 and 186 will be off This allows the voltage divider made with resistors 166, 168 and 172 to allow node 170 to float high. This turns the FET's on into saturation, thereby providing full voltage to the load. The system will loose its ability to share current between the power supplies, but it will not shut down unless there has already been a failure of one of the power supplies.

Figure 7:
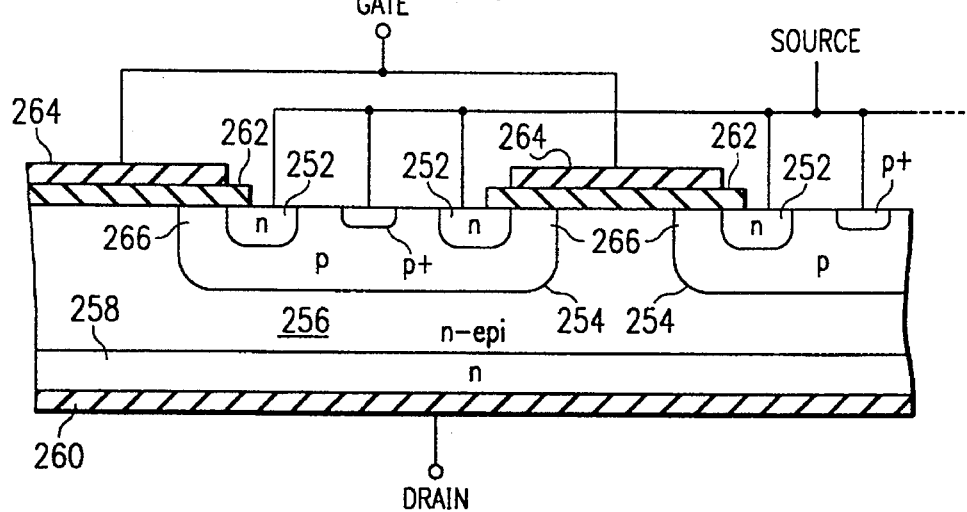
FIG. 7 illustrates a cross-sectional view of the FET.

Referring now to FIG. 7, there is illustrated a cross sectional diagram of each of the transistors 132–136. The transistors 132–136 are power transistors which are N-type MOS transistors. Each of the transistors 132–136 have a plurality of N-type source regions 252 disposed in a plurality of P-type wells 254. Although illustrated in cross-sectional view, each of the source regions 252 in each of the P-type wells 254 is comprised of a donut shaped implant region that is disposed in a P-type well 254 such that the outer peripheral edge of the donut shaped implant region forming the source regions 252 is disposed a predetermined distance from the outermost edge of the P-type well 254. This will form the channel region, which is a lateral channel. Each of the P-type wells 254 is formed in an N-type expitaxial layer 256 which is formed on an N-type substrate 258. A drain metallization layer 260 is disposed on the lower side of the N-type substrate 258. A layer of gate oxide 262 is formed over a portion of the P-type well 254 between the outermost edge of the donut shaped implant region forming the N-type source regions 252 and the outermost edge of the P-type well 254. A gate electrode 264 is disposed over the gate oxide layer 262. This will therefore define the channel regions 266 under each of the gate electrodes 264. It can be seen that a channel region will be formed between the N-type source region 252 within the P-type well 254 and extending to the N-type expitaxial layer 256. Current will then flow down through the N-type expitaxial layer 256 to the N-type layer 258 and to the drain metallization layer 260. The sources of the transistor at implant regions 252 are connected to the P-type wells 254 to form the internal diode.

Figure 7A:
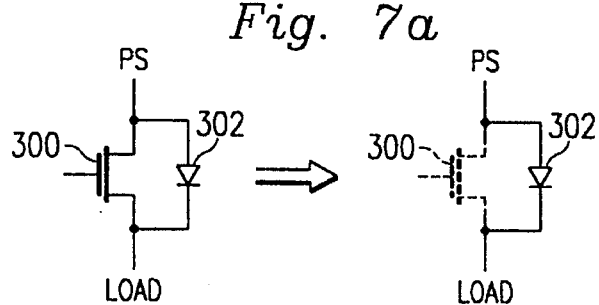
FIG. 7a illustrates a diagrammatic view of the orientation of the diode with the internal diode thereof reverse biased.

Referring now to FIG. 7a, there is illustrated a diagrammatic view of one of the transistors 132–136, referred to by the reference numeral 300. It can be seen that an internal diode 302 is connected across the source/drain path thereof The orientation is such that the diode 302 is oriented to have the anode thereof connected to the power supply side and the cathode thereof connected to the load side, such that when the transistor 300 is turned off and the power supply value falls below the voltage on the load, due to one power supply, for example, failing, the diode 302 will be reverse biased and will not draw current therethrough. Of course, in the operational mode, if the power supply were to rise too high when the transistor 300 were turned off, current would pass through the diode 302. However, this is not a problem since the voltage on the diode must be above 0.7 volts, which is unlikely. If for any reason the voltage does rise high enough to forward bias the FET's internal diode, the supply will be shut off via the on/off control circuitry that goes to the PS_ON inputs of the supply (shown in FIG. 4). It should be understood that the CPU 80 may have control over these inputs.

Figure 8:
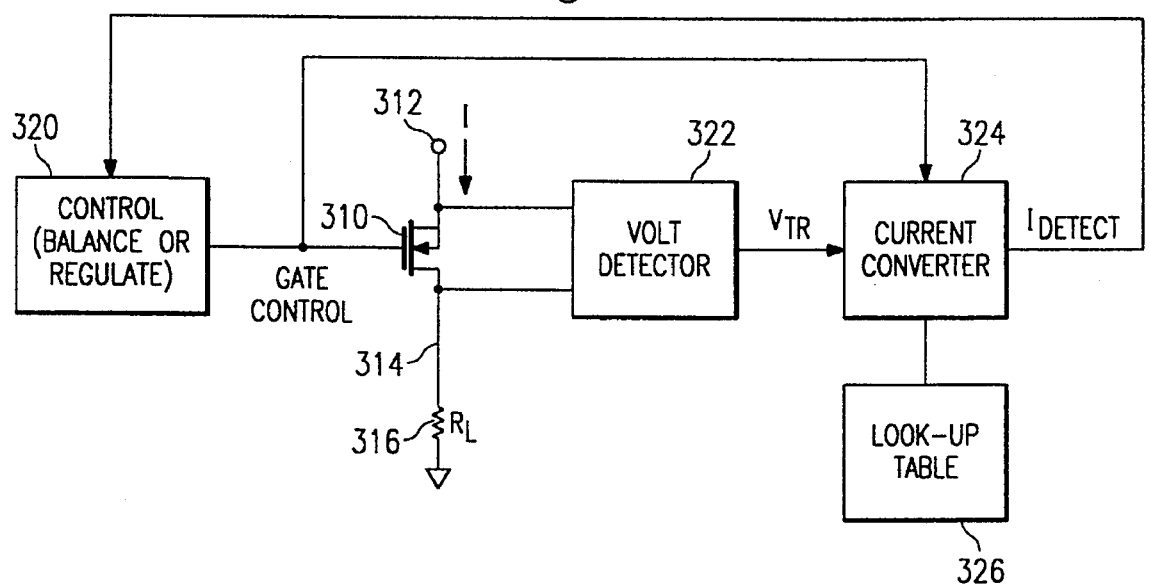
FIG. 8 illustrates a block diagram of the preferred embodiment.

Referring now to FIG. 8, there is illustrated a block diagram of the preferred embodiment of present invention utilizing some of the techniques described above. In the embodiment of FIG. 8, a transistor 310 is provided, which is an MOS transistor of the type described above with reference to transistors 70 and 72. Transistor 310 has one side of the source/drain path thereof connected to a terminal 312 and the other side thereof connected to a node 314. Node 314 is connected to one side of a load resistor 316, the other side of load resistor 316 connected to ground. As such, when current is input to terminal 312, it will pass through the source/drain path of transistor 310.

The level of the current depends upon the value of the transconductance associated with the transistor 310 which is defined by the gate-to-source voltage of transistor 310. The gate of the transistor 310 is connected to the output of a control circuit 320, which control circuit is operable to either provide a balance operation for shared power supplies or provide a regulation operation via a series control element wherein the transistor 310 is utilized to vary the series resistance between terminal 312 and node 314 in order to control the current flow therethrough.

In order to effect any kind of balancing operation between shared power supplies or regulation operation via a series element, it is necessary to measure the current through the current path between input terminal 312 and node 314. In the past, this has been done by disposing a series resistance element in series with the source/drain path of a control transistor and then measuring the voltage thereacross. However, this resulted in unwanted power dissipation and also required additional voltage overhead to accommodate the voltage drop across the resistor. In the present embodiment, the drain-to-source voltage is measured by a voltage detector 322 to determine the voltage across transitors 310 and this is then input to a current converter 324 which utilizes a look up table 326 to determine the impedance of the transistor 310 associated with the gate voltage thereof and convert the voltage across the transistor 310 to a current. The gate voltage of the transistor 310 also input to the current converter 324. To look up table 326 contains information regarding the transistor characteristics in the from of the series resistance as a function of the gate voltage. This series resistance is then utilized, in conjunction with the voltage across the transistor 310, to determine what the current is.

This is then input back to the control circuit 320 and utilized in the control function. The advantage to this type of operation is that the control element, i.e., the transistor 310, is also utilized as the current sensing element.

The control circuit 320 is realized with the use of a CPU. In general, this is substantially identical to the CPU 80 described hereinabove which has internal thereto analog-to-digital converters for receiving an analog signal and converting to an digital signal and also digital-to-analog convertors for converting a digital signal into a gate control signal, described above with respect to FIG. 6. This provides a processing function that can realize the functionality described in FIG. 8.

Figure 9:
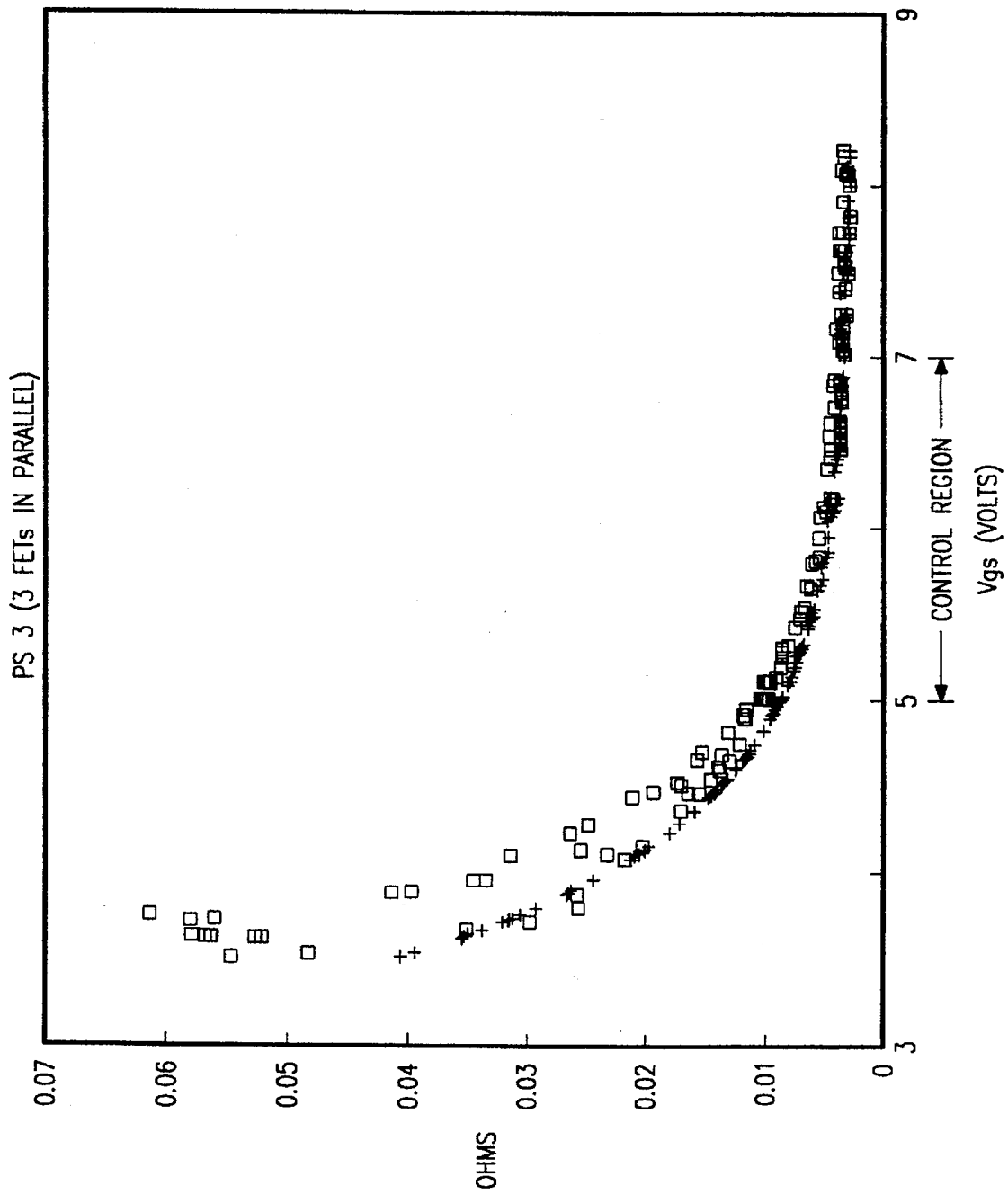
FIG. 9 illustrates a plot of the series resistance of an FET versus its gate voltage.

Referring now to FIG. 9, there is illustrated a plot for three transistors disposed in parallel illustrating the relationship between the resistance of the source/drain path and the gate-to-source voltage. In general, when three transistors are disposed in parallel, the slight differences in the response of the three transistors will balance out, due to the fact that any increase in current due to an imbalance or mismatch will result in that transistor heating up and its response changing. Further, the desired linear control region will be found between five to seven volts and the system is designed such that the gate-to-source voltage will be maintained within this region. The transistor that was utilized to determine these plots is a Siliconixs SUP60N06-08 transistor.

Figure 10:
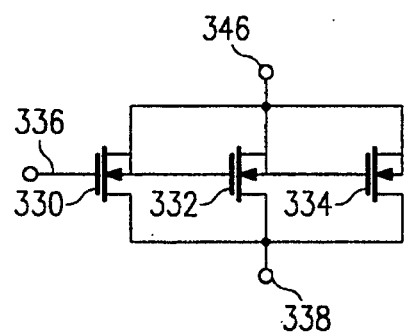
FIG. 10 illustrates a block diagram of three transistors disposed in parallel.

Referring now to FIG. 10, there is illustrated a schematic diagram of three transistors 330, 332, and 334 disposed in parallel, with the gates thereof connected to a gate terminal 336, the sources thereof connected to a source terminal 338 and the drains thereof connected together and to a common drain terminal 340. All three transistors 330–334 are connected to a common heat sink, as described above with reference to FIG. 4. Note: These transistors still have individual gate resistors as shown in FIG. 6 at 142, 144 and 146.

Although the preferred embodiment has been described in detail, it should be understood that various changes, substitutions and alterations can be made therein without departing from the spirit and scope of the invention as defined by the appended claims.

What is claimed is:

1. An apparatus for regulating a flow of current in a power supply device, comprising: a transistor disposed in a current path of said power supply device on an output thereof and having its source/drain path connected between the output of the power supply device and an external load, a series impedance of said transistor controlled by a received control signal and said transistor having a known impedance relationship to a voltage level of said control signal;

a voltage detector for detecting a voltage across said transistor;

a control processor for receiving said control signal and determining an impedance value of said transistor from said voltage level of said received control signal in conjunction with said known impedance relationship and calculating a current through said transistor from said detected voltage across said transistor and said determined impedance value of said transistor; and a control system for controlling said power supply device utilizing said calculated current through said transistor through generation of said control signal.

2. The apparatus of claim 1, wherein said control processor comprises:

a look up table for storing said known impedance relationship of said transistor; and a processor for receiving said control signal and retrieving from said look up table the impedance value associated with said voltage level of said received control signal, said processor then operable to receive said detected voltage across said transistor and calculate said current utilizing said impedance value retrieved from said look up table.

3. The apparatus of claim 2, wherein said processor is further operable as a part of said control system calculate a new value for said control system in accordance with information stored in said look up table in order to provide regulation of the flow of current from the power supply device to an external load in accordance with a predetermined power supply control scheme.

4. The apparatus of claim 1, wherein said voltage detection device comprises an analog-to-digital converter.

5. The apparatus of claim 1, wherein said transistor comprises a MOS transistor.

6. The method for regulating a flow of current in a power supply device, comprising the steps of:

connecting the source/drain path of an transistor in series with a current path of the power supply device, such that current flows therethrough, and connecting a control signal to the gate thereof, an impedance of the transistor controlled by the received control signal and the transistor having a known impedance relationship to a voltage level of the control signal;

detecting a voltage across the transistor;

determining an impedance value of the transistor that is associated with the voltage level of the control signal as defined by the known impedance relationship and utilizing the determined impedance of the transistor in conjunction with the detected voltage across the transistor to calculate a current through the transistor; and controlling the power supply utilizing the calculated current through the transistor and generating the control signal.

7. The method of claim 6, wherein the step of determining the impedance value of the transistor comprises:

storing the known impedance relationship of the transistor in a look up table;

retrieving the impedance associated with the voltage level of the control signal from the look up table; and calculating the current through the transistor utilizing the detected voltage across the transistor in conjunction with the impedance value retrieved from the look up table.

8. The method of claim 7, and further comprising the step of calculating a new value for the control signal in accordance with information stored in the look up table in order to provide regulation of the flow of current from the power supply device to an external load in accordance with a predetermined power supply control scheme.

9. The method of claim 6, wherein the step of detecting the voltage across the transistor comprises inputting the voltage level across the transistor to an analog-to-digital converter and outputting a digital value therefor.

10. The apparatus of claim 1, wherein said transistor is turned off by said control signal, said control processor further providing a power on/off signal to said power supply, wherein said control processor turns off said power supply by said on/off signal upon determining by said control signal that said transistor is turned off and said voltage detector detects a voltage across said transistor above a predetermined level.

11. The method of claim 6, wherein said transistor is a MOS transistor.

\* \* \* \* \*

UNITED STATES PATENT AND TRADEMARK OFFICE
CERTIFICATE OF CORRECTION

PATENT NO.   : 5,592,394
DATED        : January 7, 1997
INVENTOR(S)  : Nathan Wiscombe It is certified that error appears in the above-indentified patent and that said Letters Patent is hereby corrected as shown below:

Col. 4, line 12, "off-the-shell" should be --off-the-shelf--.

Col. 5, line 67, "mined" should be --turned--.

Claim 3, line 2, "control system calculate" should be --control system to calculate--.

Signed and Sealed this

Twenty-second Day of April, 1997

Attest:

BRUCE LEHMAN

*Commissioner of Patents and Trademarks*

*Attesting Officer*